United States Patent
Shah

(10) Patent No.: US 7,391,468 B2
(45) Date of Patent: Jun. 24, 2008

(54) TELECINE CONVERSION DETECTION FOR PROGRESSIVE SCAN PLAYBACK

(75) Inventor: Anup U. Shah, Fremont, CA (US)

(73) Assignee: Magnum Semiconductor, Inc., Fremont, CA (US)

(*) Notice: Subject to any disclaimer, the term of this patent is extended or adjusted under 35 U.S.C. 154(b) by 575 days.

(21) Appl. No.: 10/948,791

(22) Filed: Sep. 24, 2004

(65) Prior Publication Data

US 2006/0007305 A1    Jan. 12, 2006

Related U.S. Application Data

(60) Provisional application No. 60/585,072, filed on Jul. 6, 2004.

(51) Int. Cl.
*H04N 7/01* (2006.01)
*H04N 11/20* (2006.01)
*H04N 5/14* (2006.01)
*H04N 9/64* (2006.01)

(52) U.S. Cl. .................... 348/441; 348/448; 348/459; 348/701

(58) Field of Classification Search .................. 348/97, 348/441, 448, 459, 700, 701
See application file for complete search history.

(56) References Cited

U.S. PATENT DOCUMENTS

| | | | | |
|---|---|---|---|---|
| 5,249,049 A * | 9/1993 | Kranawetter et al. | ........ | 348/473 |
| 5,689,301 A * | 11/1997 | Christopher et al. | .......... | 348/97 |
| 6,084,641 A * | 7/2000 | Wu | ............................ | 348/722 |
| 6,452,199 B1 * | 9/2002 | Partlo et al. | ............. | 250/504 R |
| 6,525,774 B1 * | 2/2003 | Sugihara | ...................... | 348/459 |
| 6,897,903 B1 * | 5/2005 | Hu | .............................. | 348/700 |
| 6,963,377 B2 * | 11/2005 | Del Corso | ................... | 348/558 |
| 7,075,581 B1 * | 7/2006 | Ozgen et al. | ................ | 348/448 |
| 7,129,990 B2 * | 10/2006 | Wredenhagen et al. | ...... | 348/449 |
| 7,154,555 B2 * | 12/2006 | Conklin | ...................... | 348/448 |
| 7,170,561 B2 * | 1/2007 | Winger et al. | ............... | 348/448 |
| 2003/0156301 A1 * | 8/2003 | Kempf et al. | ............... | 358/486 |
| 2005/0168653 A1 * | 8/2005 | Wyman | ...................... | 348/700 |

\* cited by examiner

*Primary Examiner*—Brian P. Yenke
(74) *Attorney, Agent, or Firm*—Robert Platt Bell; Maryam Imam

(57) ABSTRACT

A moving average filter with a weighting factor calculates a continuously programmable threshold to determine whether fields could be considered identical or not. This decision is used to detect the cadence of a TELECINE encoded video signal. This moving average filter is also used for detecting the presence of still images in the video data stream by detecting total difference in Y (luminance) of the fields and then calculating the average difference in luminance (Y) of the field. This average difference in luminance value indicates a degree of difference between fields. For two frames of data input to the system, each having two fields, a difference is calculated between the luminance values of the two top fields for each frame. From this difference value a maximum absolute difference history is stored, along with the Sum of Absolute Differences (SAD). The programmable threshold is then calculated by summing the saturated SAD history over time. If the present SAD is less than the program threshold, then a low point is detected (e.g., small difference between two fields) and if it follows TELECINE pattern, then the cadence of TELECINE is indicated.

32 Claims, 2 Drawing Sheets

TELECINE CONVERSION DETECTION FOR PROGRESSIVE SCAN PLAYBACK

CROSS-REFERENCE TO RELATED APPLICATIONS

The present application claims priority from Provisional U.S. Patent Application No. 60/585,072 filed on Jul. 6, 2004, and incorporated herein by reference.

FIELD OF THE INVENTION

The present invention relates to DVD and other types of video playback equipment. In particular, the present invention is directed toward a method and apparatus for generating a progressive scan display image without artifacts when using as source material, a 30 frame per second (FPS) interlaced recording of a 24 FPS source material (e.g., motion picture).

BACKGROUND OF THE INVENTION

Motion Pictures (movies) are generally provided in a format of 24 frames per second. Television pictures (e.g., NTSC video), on the other hand, are generally broadcast at approximately 30 frames per second using two interlaced fields (i.e., at a field rate of substantially 60 fps).

In order to convert a motion picture image to a television image, a technique known as TELECINE is used. TELECINE is a process to bring a 24 fps (frames per second) source video (usually a movie is shot at that speed) to approximately 30 fps or approximately 30×2 interlaced fields per second. As the ratio of television frames to motion picture frames is 30:24 (or 5:4), one way to correct for the discrepancy between the two formats is to repeat every $4^{th}$ frame of the motion picture image to provide an equivalent number of frames for a television image. However, TELECINE uses a slightly more complex technique to achieve this result, in order to reduce jerkiness in the image associated with repeating every $4^{th}$ frame.

Since a television image is interlaced, it is possible to repeat only a field of one frame with the field of the next frame. The averaging effect of old phosphor-screen CRTs would then reduce or eliminate any artifacts. This solution was good for the era of CRT television displays but may not be suitable in the modern era of non-interlaced monitors and the like.

As an example, suppose each frame contains two interlaced fields, which will be referred to as TOP (T) and BOTTOM (B). The two fields are interlaced, not above or below one another. The TOP and BOTTOM nomenclature is purely as a matter of reference. For a series of five frames, the TELECINE scheme may be represented as follows:

|  | FRAME: | | | | |
| --- | --- | --- | --- | --- | --- |
|  | 1 | 2 | 3 | 4 | 5 |
| TOP FIELD: | T1 | T1 | T2 | T3 | T4 |
| BOTTOM FIELD: | B1 | B2 | B3 | B3 | B4 |

Thus, a first frame of the resultant video image may comprise the top and bottom fields of the first frame of source material. The second frame comprises the top field of the first frame of the source material, and the bottom field of the second frame of source material, and so on. In this scheme, no single frame is repeated twice. Rather, composite frames are made from two adjacent fields. For example the second frame is made up of the top field 1 and bottom field 2. This scheme is well known in the art and is a solution, which worked well for older and smaller TV sets. In this manner, the image is better averaged over time, resulting in a reduction of jerkiness or the like. When used with a CRT display, the time averaging effects of a phosphor screen works to the advantage of such a scheme. However, with more modern non-interlaced displays as well as flat panel screens, such a technique may not be as optimal.

One problem with the above described TELECINE method is that many DVDs on the market today have TELECINE encoded data (e.g., data converted from 24 FPS cinema to NTSC video or the like) rather than the original 24 FPS cinema source material. These TELECINE encoded discs are generally created by recording a DVD from an NTSC analog signal generated from an original 24 FPS motion picture (cinema) source.

For example, a 30 FPS TELECINE encoded DVD may be created by recording a DVD from an original 24 FPS DVD as follows:

| DVD | | NTSC | | DVD |
| --- | --- | --- | --- | --- |
| 24 FPS | → | TV | → | 30 FPS |
| PLAY | | SIGNAL | | RECORD |

Thus, a movie recorded to a recordable DVD off the air might be in such a format, as it was previously converted from 24 FPS motion picture video to NTSC television using TELECINE and then recorded on a DVD as 30 FPS NTSC video. Commercially produced DVDs and the like may also be recorded using such a technique. This situation may lend itself to other areas of video data storage, such as hard drive data storage and the like.

However, a problem is created when using modern television displays, such as progressive scan monitors. Since the interlaced lines may be displayed progressively, a moving object may appear funny. Specifically, since adjacent lines may be from different time periods ($\frac{1}{60}^{th}$ of a second apart), a "comb" effect may occur if the object is moving from one frame to another.

| ORIGINAL IMAGE | REPRODUCED IMAGE |
| --- | --- |
| ---------- | ---------- |
| ---------- | ---------- |
| ---------- | ---------- |
| ---------- | ---------- |

One way to avoid this problem is to use only one field of each frame and expand the field using known filtering techniques to create a full frame. This solution does tend to reduce vertical resolution, which is unacceptable in the high-resolution television market. This technique may also introduce other artifacts. For stationary objects (e.g., landscape scene) where there is no movement, filtering techniques may create "jitter" between adjacent lines, particularly where straight horizontal edges occur. A number of solutions for reducing jitter in computer and television displays exist, but even using such techniques, jitter can still be a problem, particularly for straight edges and thin lines that may not average well with adjacent pixels.

One Prior Art solution to this jitter problem is to try to recreate the original 24 FPS image from the 30 FPS TELE- CINE image using temporal filtering techniques. Referring back to the diagram above, we see that the fields are presented in a known pattern in a TELECINE conversion:

|              |    |    | FRAME: |    |    |    |     |      |
| ------------ | -- | -- | -- | -- | -- | -- | --- | ---- |
|              | 1  | 2  | 3  | 4  | 5  | 6  | ... | etc. |
| TOP FIELD:   | T1 | T1 | T2 | T3 | T4 | T5 | ... | etc. |
| BOTTOM FIELD:| B1 | B2 | B3 | B3 | B4 | B5 | ... | etc. |

The difference between adjacent fields may be used to indicate whether an image is TELECINE encoded or not. For example, in the first two frames 1 and 2, both upper fields are T1. In actuality, they are not completely identical, as the image has been converted from digital to analog and back to digital again. Thus, the two T1 fields may be slightly different. For the sake of illustration, they will be referred to as T1A and T1B.

However, fields T1 and T2 will be much more different if there is any motion in the scene whatsoever. If the difference (e.g., luminance difference) is sampled between adjacent fields and if a certain pattern or "cadence" is detected, then a determination can be made as to whether the signal is TELECINE encoded. Once this information is known, the proper fields can be extracted and the original 24 FPS cinema image can be recreated and displayed on a progressive scan monitor (repeating one frame out of four) without the motion artifacts or the jitter artifacts.

FIG. 1 is a graph illustrating luminance differences in the samples compared with a threshold value for detecting TELECINE encoding. In the graph of FIG. 1, the Y-axis represents a relative luminance difference value between two fields. The S values on the X-axis represent different frame points. The difference values for the example illustrated above may be calculated as follows:

$S1 = T1B - T1A$ $S2 = T2 - T1B$ $S3 = T3 - T2$ $S4 = T4 - T3$ $S5 = T5A - T4$ $S6 = T5B - T5A$

As illustrated in FIG. 1, these differences create an "error profile" which is easily identifiable. A threshold value may be calculated to determine whether adjacent fields are considered identical or not. If this pattern or cadence is detected, then the fields can then be stored in a field store and then reconstituted into 24 FPS cinema as follows:

|               |    |    | FRAME: |    |    |
| ------------- | -- | -- | -- | -- | -- |
|               | 1  | 2  | 3  | 4  | 5  |
| TOP FIELD:    | T1 | T2 | T3 | T4 | T5 |
| BOTTOM FIELD: | B1 | B2 | B3 | B4 | B5 |

The 24 FPS data stream can be reconstructed by storing the individual fields and then reconstructing them back to their original (pre-TELECINE) order. This 24 FPS data can then be displayed on a progressive scan monitor without the introduction of artifacts or the like.

Techniques of detecting TELECINE encoding in an NTSC or other video signal are known in the art. While others have reconstituted 24 FPS cinema from 30 FPS NTSC TELECINE video, there have been some problems. For example, a long scene where the camera does not move and there is no movement (e.g., landscape or black screen or still image) will not show the cadence illustrated above. Moreover, when a scene change or commercial break occurs, the cadence may be interrupted, making conversion from source video back to 24 FPS more difficult and/or throwing off the conversion process. A better filtering technique is thus needed to detect this cadence for still images and also for scene changes.

SUMMARY OF THE INVENTION

The present invention provides a moving average filter with weighting factor to calculate continuously programmable threshold to determine whether fields could be considered identical or not. This determination is used to detect the cadence of a TELECINE encoded video signal. This moving average filter is also used for detecting the presence of still images in the video data stream.

For two frames of data input to the system, each having two fields, a difference is calculated between the luminance values of the two top fields for each frame. To reduce the calculation overhead, a number of lines may be skipped when calculating luminance difference. From this difference value, a maximum absolute difference history is stored, along with the Sum of Absolute Differences (SAD). The programmable threshold is then calculated by taking a moving average of the saturated SAD history over time and applying a weighting factor. If the present SAD is less than the program threshold, a low point is detected (e.g., small difference between two fields) and if it follows TELECINE pattern then the cadence of TELECINE is indicated.

If the TELECINE cadence is not detected, then further calculation is made to determine whether a still image is present. For a still image, all difference values may be low, and thus the cadence of TELECINE may be difficult to detect. If the SAD is too large, then it is assumed that there is a scene change in the video. Filter histories are reset such that previous scene statistics does not affect cadence detection in a new scene.

The still image detection algorithm is two fold decision. First it compares that the SAD with a predetermined threshold called the saturated_still_SAD. In a second step it compensates the predetermined threshold by a factor of the moving average of the SAD history. If maximum of maximum absolute difference history is smaller than compensated threshold, then a still picture is detected.

From these determinations, a decoder can then reconstruct 24 FPS source video from a 30 FPS TELECINE encoded video, and the 24 FPS video can then be displayed on a modern monitor (e.g., non-interlaced display) without the artifacts introduced by TELECINE encoding. Even if a still image is present, the decoder can reconstruct the data in 24 FPS format, even though the cadence of the TELECINE encoding is not present. The detection of scene changes and the like ensure that a false TELECINE cadence is not detected by resetting the cadence detection upon the realization of a scene change.

DETAILED DESCRIPTION OF THE INVENTION

Figure 2:
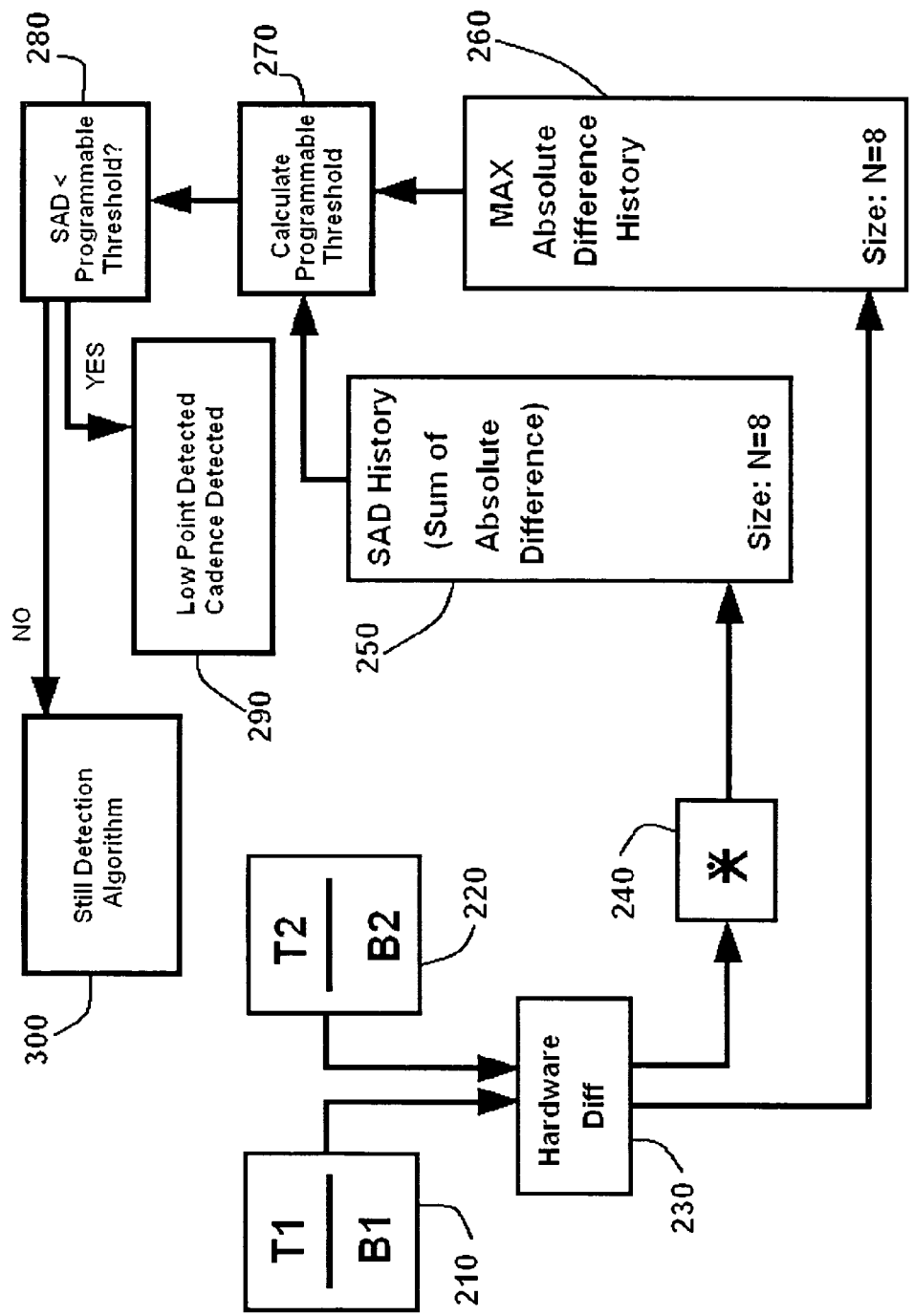
FIG. 2 is a block diagram illustrating the operation of the method and apparatus of the present invention.

FIG. 2 is a block diagram illustrating the operation of the method and apparatus of the present invention. Referring to FIG. 2, the present invention provides a moving average filter 240 with a weighting factor to calculate the continuously programmable threshold to determine whether fields could be considered identical or not, in order to better detect the cadence of a TELECINE encoded video signal. This moving average filter is also used in detecting the presence of still images in the video data stream by detecting total difference in Y (luminance) of the field or a sample portion thereof, and then calculates the average difference in luminance (Y) of the frame. This average luminance value indicates the degree of difference between fields.

As illustrated in FIG. 2, two frames of video data 210 and 220 may be input to the system, each having two fields, T1 and B1 and T2 and B2, respectively. A difference is calculated between the luminance values of the two fields for each frame in hardware difference calculator 230 which may be implemented in hardware or software, firmware, or the like.

From the difference values calculated in difference calculator 230, a maximum absolute difference history may be stored in register 260. In saturate SAD block 240, the absolute differences are summed to produce a Sum of Absolute Differences (SAD), which may be stored in register 250. Saturate SAD block 240 calculates the saturate SAD as follows:

$$\text{Saturate\_SAD} = \text{MIN}\left(SAD, \frac{\text{width} * \text{height} * 10}{2 * \text{skip-lines}}\right)$$

Where the term SAD is the sum of absolute differences between pixels of adjacent fields or $\Sigma_i d_i$ and the term $$\frac{\text{width} * \text{height}}{2 * \text{skip-lines}}$$

represents the number of pixels compared between two adjacent fields.

Figure 1:
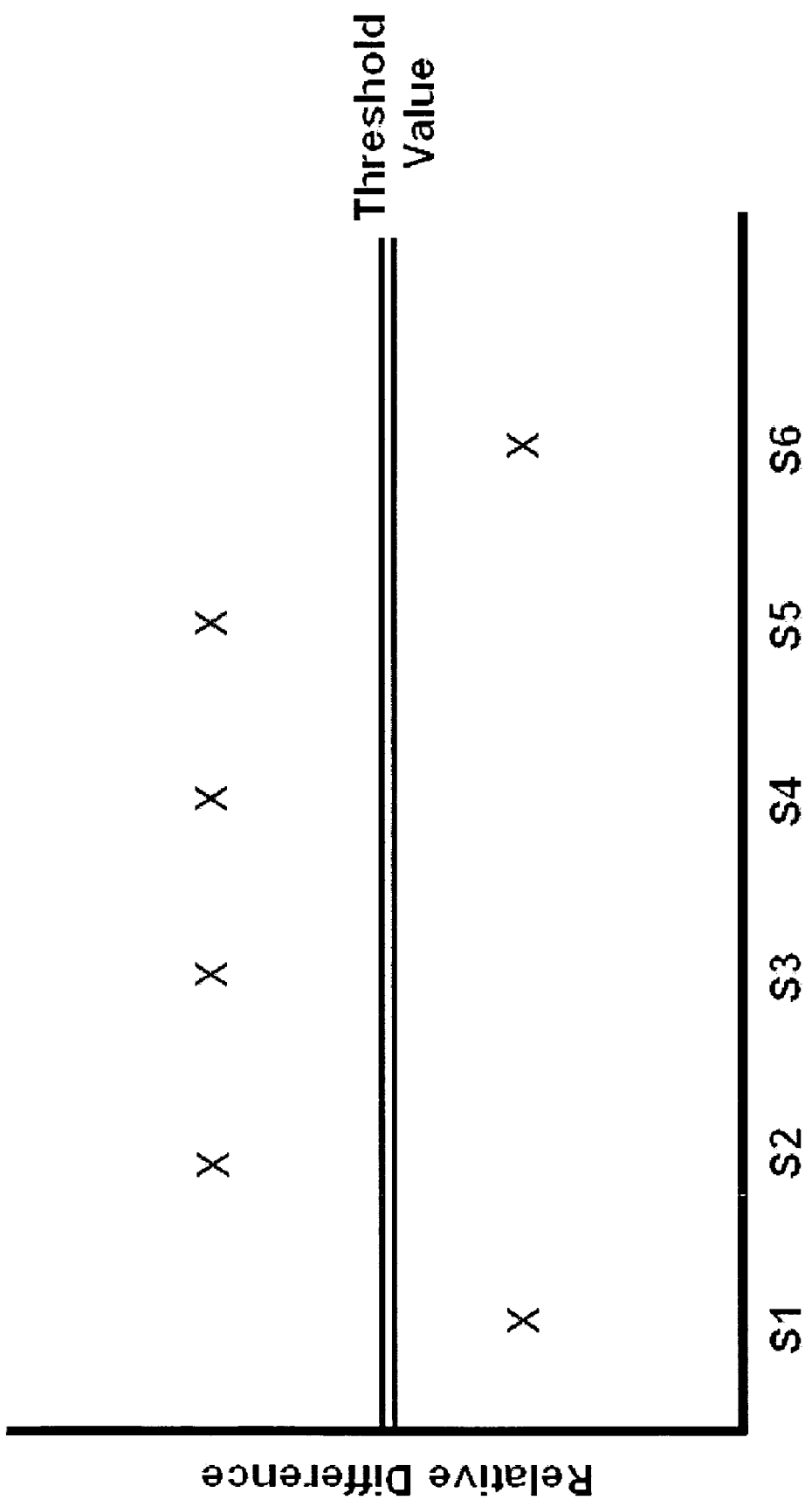
FIG. 1 is a graph illustrating the differences in the samples compared with a threshold vale for detecting TELECINE encoding.

From the data in registers 250 and 260, the programmable threshold may then be calculated using software, firmware, hardware or the like (not shown) as part of an image processing system. If the present SAD (for a given pair of frames) is less than the program threshold, a low point is detected (e.g., a small difference exists between the two fields, which can indicate either a portion of the TELECINE cadence is detected, or the two fields are part of a still image). If the subsequent pattern of comparisons follows the TELECINE order the cadence (e.g., in FIG. 1), then TELECINE is indicated. The program threshold may be calculated as follows:

$$\text{program\_thre} = \left(\frac{6}{10*N}\right) \sum_{i=0}^{N-1} \text{Saturated\_SAD\_History}[i]$$

When the present SAD (for a given pair of frames) is higher than the programmable threshold, then cadence is considered to be broken. In this case, a further calculation is made to determine whether a still image is present. For a still image, all difference values may be low, and thus the cadence of TELECINE may be difficult to detect.

The still image detection algorithm first calculates a maximum of the maximum absolute difference history, or MAXMAX:

MAXMAX=MAX(Max_Absolute_Diff_History[i])

Next, the saturated_still_SAD is calculated as a function of the width and height of each field divided by a predetermined constant times the number of skipped lines in the frame:

$$\text{saturated\_still\_SAD} = \frac{\text{width} * \text{height}}{4 * \text{skiplines}}$$

where the term $$\frac{\text{width} * \text{height}}{4 * \text{skiplines}}$$

is essentially $\Sigma_i 0.5$ for I=1 to N, where N is the number of pixels compared.

Compensated SAD is then calculated taking a moving average of the SAD history and then subtracting this value from the saturated_still_SAD and dividing by a predetermined constant (weighting factor) times the saturated_still_SAD:

$$\text{Compensate\_SAD} = 255 \left[ \frac{\text{saturated\_still\_SAD} - \frac{1}{2*N} \sum_{i=0}^{N-1} \text{Saturated\_SAD\_History}[i]}{8 * \text{saturated\_still\_SAD}} \right]$$

The idea is to allow MAXMAX more headroom if the average of Saturated_SAD_History is low and less headroom if it is large.

To determine whether a still picture (no movement, blank screen, freeze frame, or the like) has occurred, the following determination is made, based upon the values calculated using the formulas above:

$$\text{If} \left( \frac{1}{2*N} \sum_{i=0}^{N-1} \text{Saturated\_SAD\_History}[i] < \text{Saturate\_SAD} \ \&\& \right.$$
$$\left. \text{MAXMAX} < (80 + \text{Compensate\_SAD}) \right)$$

then still detected
else still not detected, where the term $$\left(\frac{1}{2*N}\sum_{i=0}^{N-1} \text{Saturated\_SAD\_History}[i] < \text{Saturate\_SAD}\right)$$

indicates that on average, the difference between two adjacent fields is small. The term MAXMAX<(80+Compensate_SAD)) indicates that the maximum of the maximum differential is smaller than the compensated threshold.

From this still detection algorithm, a decoder can be adjusted to perform a 30 FPS TELECINE to 24 FPS conversion. Since the upper fields for each frame will be consistent with one another, and the lower fields of each frame will be consistent, the 24 FPS conversion can be performed for a still image by using the same techniques when the cadence is detected. Once the still image ends (e.g., action takes place), the TELECINE encoding cadence can then be detected as described above, and the conversion process continue as in the prior art. By detecting the presence of still images, the system prevents the 30 FPS TELECINE to 24 FPS conversion from being prematurely terminated and reduces the introduction of artifacts into such a conversion.

While the preferred embodiment and various alternative embodiments of the invention have been disclosed and described in detail herein, it may be apparent to those skilled in the art that various changes in form and detail may be made therein without departing from the spirit and scope thereof.

I claim:

1. A method of convening an encoded video data at a frame rate expanded by including repeated video fields to a source video data at an original frame rate, comprising:
    applying a moving average filter with a weighting factor to calculate a continuously programmable threshold to determine whether fields of successive fields from successive frames of encoded video data could be considered identical or not, and
    measuring the total difference in luminance values of the successive fields relative to the continuously programmable threshold in order to detect a characteristic cadence of the encoded video signal,
    wherein the moving average filter detects the presence of still images in the encoded video data by detecting total difference in luminance of the successive fields and then calculating the average difference in luminance of the successive fields, where the average difference in luminance value indicates a degree of difference between the successive fields,
    wherein the encoded video data comprises TELECINE encoded video data,
    wherein for the successive frames, a difference value is calculated between the luminance values of the fields for each successive frame, and from the difference value a maximum absolute difference history is stored, along with a Sum of Absolute Differences (SAD), and
    wherein the programmable threshold is then calculated by applying a moving average filter with a weighting factor to a saturated SAD history over time.

2. The method of claim 1, wherein if a present SAD is less than the program threshold, a low point representing a small difference between the two successive fields, is detected as a portion of the characteristic cadence of TELECINE encoded video.

3. The method of claim 2, wherein if successive comparisons of the SAD to the programmable threshold for successive frames of video data indicate the characteristic cadence of TELECINE encoded video, then TELECINE encoded video is determined to be detected.

4. The method of claim 3, wherein if the characteristic cadence of TELECINE is not detected, a further calculation is made to determine whether a still image is present by first calculating a maximum of the maximum absolute difference history (MAXMAX), calculating a saturated_still_SAD as a function of width and height of the frame divided by a proportional number of skipped lines.

5. The method of claim 4, wherein calculating to determine whether a still image is present further includes calculating a compensated SAD, based upon the moving average of the SAD history and the saturated_still_SAD wherein if the moving average of the saturated SAD history is less than the saturated_still_SAD and the MAXMAX value is less than the compensated SAD plus a predetermined weighting value then a still picture is detected in the data stream.

6. The method of claim 5, wherein if the characteristic cadence of TELECINE is detected, the TELECINE video data is decoded into source video by combining fields from adjacent frames in a predetermined pattern.

7. The method of claim 6, wherein the total difference between luminance values of successive fields from successive frames of TELECINE encoded video data is calculated.

8. The method of claim 7, wherein from the difference in luminance values, a maximum absolute difference history is stored in a first register.

9. The method of claim 8, wherein absolute differences are summed to produce Sum of Absolute Differences (SAD), which is stored in a second register.

10. The method of claim 9, wherein the Saturate SAD is calculated by:

$$\text{Saturate\_SAD} = \text{MIN}\left(SAD, \frac{\text{width}*\text{height}*10}{2*\text{skip-lines}}\right)$$

wherein the term SAD is the sum of absolute differences between adjacent fields or $\Sigma_i di$ and the term $$\frac{\text{width}*\text{height}}{2*\text{skip-lines}}$$

represents the number of pixels compared between two adjacent fields).

11. The method of claim 10, wherein from the first and second registers, the programmable threshold is calculated by:

$$\text{program\_thre} = \left(\frac{6}{10*N}\right)\sum_{i=0}^{N-1} \text{Saturated\_SAD\_History}[i].$$

12. The method of claim 11, wherein if a SAD for a given pair of frames is higher than the programmable threshold, then a scene change is determined possible, if the characteristic cadence of TELECINE is not detected, wherein a further calculation is made to determine whether a still image is present.

13. The method of claim 12, wherein calculation of whether a still image is present comprises calculating a maximum of the maximum absolute difference history, or MAXMAX by:

MAXMAX=MAX (Max_Absolute_Diff_History[i]).

14. The method of claim 13, wherein calculation of whether a still image is present further comprises calculating saturated_still_SAD a function of width and height of each field divided by a predetermined constant times the number of skipped lines in the field as:

$$\text{saturated\_still\_detect\_SAD} = \frac{width * height}{4 * skiplines}.$$

15. The method of claim 14 wherein calculation of whether a still image is present further comprises calculating compensated SAD by calculating a moving average of the SAD history and then subtracting this value from the saturated_still_SAD and dividing by a predetermined constant (weighting factor) times the saturated_still_SAD as:

$$\text{Compensate\_SAD} = 255 \left[ \frac{\text{saturated\_still\_SAD} - \frac{1}{2*N}\sum_{i=0}^{N-1} \text{Saturated\_SAD\_History}[i]}{8 * \text{saturated\_still\_SAD}} \right].$$

16. The method of claim 15, wherein a determination of whether a still picture has occurred is made by:

$$\text{If} \left( \frac{1}{2*N}\sum_{i=0}^{N-1} \text{Saturated\_SAD\_History}[i] < \text{saturate\_still\_SAD} \ \&\ \& \right.$$
$$\left. \text{MAXMAX} < (80 + \text{Compensate\_SAD}) \right)$$

then still detected
else still not detected,
where the term $$(\frac{1}{2*N}\sum_{i=0}^{N-1} \text{Saturated\_SAD\_History}[i] < \text{Saturate\_SAD}$$

indicates that on average, the difference between two adjacent fields is small, and the term MAXMAX<(80+Compensate_SAD)) is the maximum of the maximum differential is smaller than the compensated threshold.

17. An apparatus of converting a first encoded video data at a frame rate expanded by including repeated video fields to a source video data at an original frame rate, comprising:
 a difference calculating module to calculate a total difference between luminance values of successive fields from successive frames of the encoded video data, and
 a comparator for comparing the total difference in luminance values of the successive fields relative to a continuously programmable threshold in order to detect a characteristic cadence of the encoded video signal, wherein the moving average filter comprises:
 a still detection algorithm for detecting the presence of still images in the encoded video data by detecting total difference in luminance of the successive fields; and
 a luminance difference detector, for calculating the average difference in luminance of the successive fields, where the average difference in luminance value indicates a degree of difference between the successive fields,
 wherein the encoded video data comprises TELECINE encoded video data,
 wherein for the successive frames, the comparator calculates a difference value between the luminance values of the fields for each successive frame, and from the difference value a maximum absolute difference history is stored, along with a Sum of Absolute Differences (SAD), and
 wherein the comparator calculates the programmable threshold by calculating a moving average to the saturated SAD history over time.

18. The apparatus of claim 17, wherein if a present SAD is less than the program threshold, a low point representing a small difference between the two successive fields, is detected as a portion of the characteristic cadence of TELECINE encoded video.

19. The apparatus of claim 18, wherein the comparator performs successive comparisons of the SAD to the programmable threshold for successive frames of video data, and if the comparator indicates the characteristic cadence of TELECINE encoded video, then TELECINE encoded video is detected.

20. The apparatus of claim 19, wherein if the comparator does not detect the characteristic cadence of TELECINE, the comparator calculates whether a still image is present by first calculating a maximum of the maximum absolute difference history (MAXMAX), calculating a saturated_still_SAD as a function of width and height of the frame divided by a proportional number of skipped lines.

21. The apparatus of claim 20, wherein the comparator calculates a compensated SAD, based upon the moving average of the SAD history and the saturated_still_SAD, wherein if the moving average of the saturated SAD history is less than the saturated_still_SAD and the MAXMAX value is less than the compensated SAD plus a predetermined weighting value then a still picture is detected in the data stream.

22. The apparatus of claim 21, wherein if the comparator detects the characteristic cadence of TELECINE, the TELECINE video data is decoded into source video by combining fields from adjacent frames in a predetermined pattern.

23. The apparatus of claim 22, wherein the comparator further comprises means for calculating a difference in luminance values between two successive fields of video data from two successive frames of video data.

24. The apparatus of claim 23, further comprising a first register, coupled to the comparator, for storing, from the difference in luminance values, a maximum absolute difference history.

25. The apparatus of claim 24, further comprising a second register, coupled to the comparator, wherein the comparator sums absolute differences to produce Sum of Absolute Differences (SAD) which is stored in a second register.

26. The apparatus of claim 25, wherein the comparator calculates Saturate SAD by:

$$\text{Saturate\_SAD} = \text{MIN}\left(SAD, \frac{\text{weight} * \text{heigh} * 10}{2 * \text{skip-lines}}\right)$$

wherein the term SAD is the sum of absolute differences between adjacent fields or $\Sigma_i di$ and the term $$\frac{\text{width} * \text{heigh}}{2 * \text{skip-lines}}$$

represents the number of pixels compared between two adjacent fields.

27. The apparatus of claim 26, wherein from the first and second registers, the comparator calculates the programmable threshold by:

$$\text{program\_thre} = \left(\frac{6}{10 * N}\right) \sum_{i=0}^{N-1} \text{Saturated\_SAD\_History}[i].$$

28. The apparatus of claim 27, wherein if a SAD for a given pair of frames is higher than the programmable threshold, then the comparator determines a scene change possible, if the characteristic cadence of TELECINE is not detected, wherein the comparator makes a further calculation to determine whether a still image is present.

29. The apparatus of claim 28, wherein the comparator determines whether a still image is present by calculating a maximum of the maximum absolute difference history, or MAXMAX by:

MAXMAX MAX=(Max_Absolute_Diff_History[i]).

30. The apparatus of claim 29, wherein the comparator determines whether a still image is present by calculating saturated_still_SAD a function of width and height of each field divided by a predetermined constant times the number of skipped lines in the field as:

$$\text{Saturate\_SAD} = \frac{\text{width} * \text{height}}{4 * \text{skiplines}}.$$

31. The apparatus of claim 30, wherein the comparator determines whether a still image is present by calculating compensated SAD by calculating a moving average of the SAD history for N pixels in a field and then subtracting this value from the saturated_still_SAD and dividing by a predetermined constant (weighting factor) times the saturated_still_SAD as:

Compensate_SAD =

$$255 \left[ \frac{\text{saturated\_still\_SAD} - \frac{1}{2*N} \sum_{i=0}^{N-1} \text{Saturated\_SAD\_History}[i]}{8 * \text{saturated\_still\_SAD}} \right].$$

32. The apparatus of claim 31, wherein the comparator determines whether a still picture has occurred by:

$$\text{If } \left(\frac{1}{2*N} \sum_{i=0}^{N-1} \text{Saturated\_SAD\_History}[i] < \text{Saturate\_SAD} \&\&\right.$$

$$\left. \text{MAXMAX} < (80 + \text{Compensate\_SAD})\right)$$

then still detected else still not detected where the term $$\left(\frac{1}{2*N} \sum_{i=0}^{N-1} \text{Saturated\_SAD\_History}[i] < \text{Saturate\_SAD}\right.$$

indicates that on average, the difference between two adjacent fields is small, and the term MAXMAX<(80+ Compensate_SAD)) is the maximum of the maximum differential is smaller than the compensated threshold.

* * * * *